Patented June 21, 1932

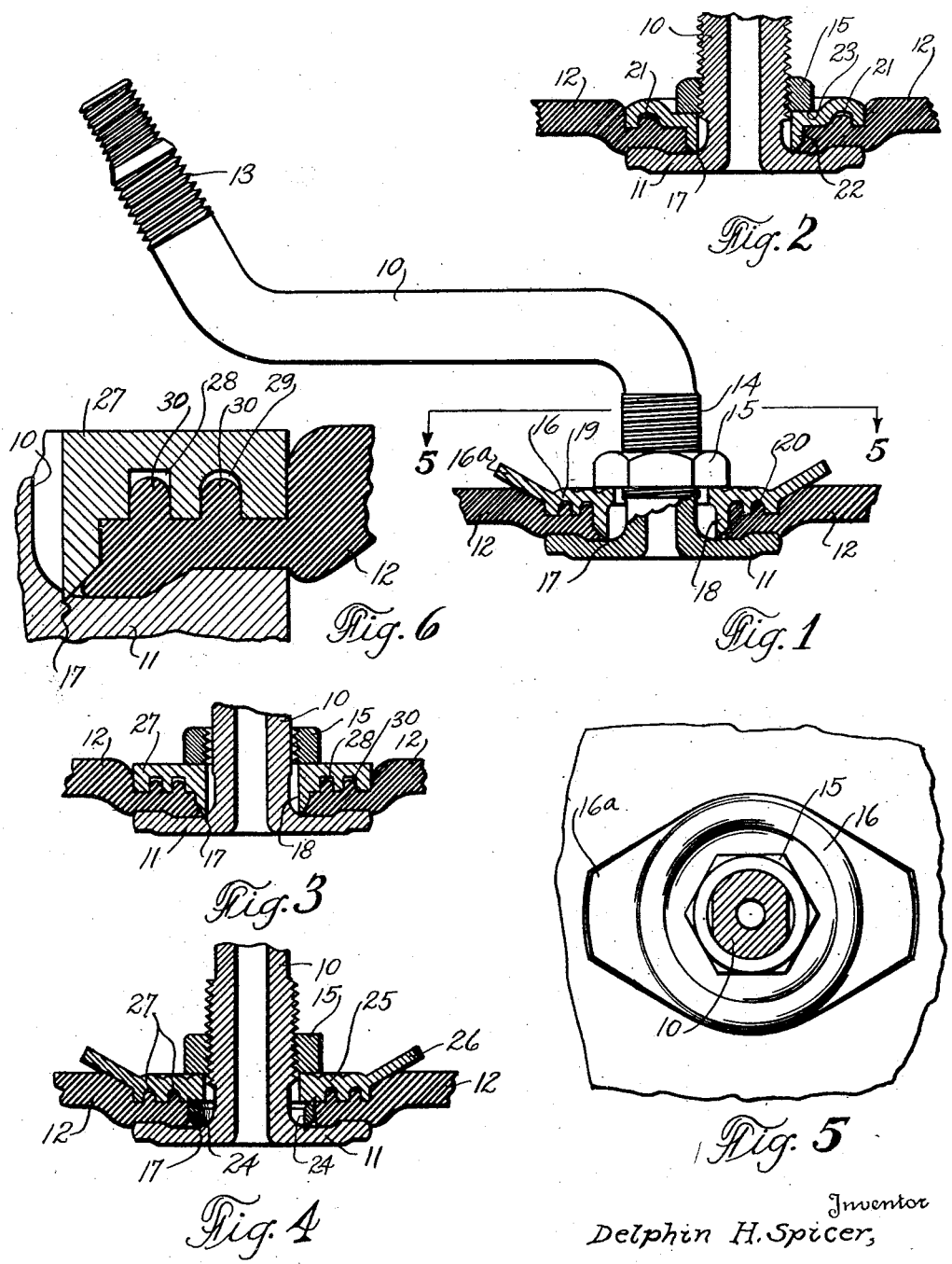

1,864,001

UNITED STATES PATENT OFFICE

DELPHIN H. SPICER, OF LAKEWOOD, OHIO

SEALING MEANS FOR TIRE VALVES

Application filed April 8, 1932. Serial No. 604,082.

This invention relates to improvements in a tire valve stem and particularly to the means for effecting a seal between such stem and the tire tube.

Considerable difficulty has been experienced in securing an efficient and durable sealing connection between the tire tube and a valve stem of standard construction, that is, one in which there is a stem or shank portion terminating in a head adapted to engage the inner surface of the tire tube and a bridge washer having a central opening through which the stem passes and between which and the head such tube is clamped. This difficulty is met with more in the case of heavy duty wheels such as are used on busses and trucks and especially in those cases where the valve stem is in contact with or closely adjacent to a brake drum. In the standard stem referred to the portion of the tube which is clamped between the head and bridge washer is subjected to a clamping pressure which is large relative to the inflation pressure of the tire, to which of course the remaining portion of the tube is subjected. One of the chief causes of the difficulty is the thinning out or shrinking of the rubber between the head and bridge washer under the influence of the high clamping pressure and the high temperature which exists at that point. This action proceeds slowly and results after a period of service in what may be called a re-molding of that portion of the tube which is confined between the head and bridge washer. Inasmuch as the tube is compressed between these members, it will when re-molded be thinner in that region than elsewhere unless additional thickness is originally provided at that point. The re-molding serves to eliminate any resistance by the tube to closer approach of these members toward each other with the result that unless the clamping nut is tightened up again there may be leakage between the head of the valve stem and the tube and thence around the stem through the central opening in the bridge washer.

It is an object of my invention to provide a seal which will be effective in preventing leakage even after the re-molding effect has reduced the clamping pressure to a negligible amount or to nothing. A further object is to reduce the re-molding effect or shrinkage by limiting the clamping pressure upon that portion of the tube which is confined between the valve stem head and bridge washer. A further object is to provide a seal which will prevent escape of air through the opening in the bridge washer even though it should pass between the valve stem head and tire tube. A further object is to provide a double surface seal whereby the surface of contact between the tube and the bridge washer may act as an emergency or reinforcing seal and prevent escape of air unless it shall have traversed both surfaces of contact between the tube and the metal. A further object is to provide a bridge washer having sealing grooves in the tube contacting surface thereof.

Other and more limited objects will appear from the following description when taken in connection with the accompanying drawing in which Fig. 1 is a part sectional view showing one embodiment of my invention as applied to a tire tube of the bent stem type; Figs. 2, 3 and 4 are similar views of modified forms; Fig. 5 is a section on the line 5—5 of Fig. 1 and Fig. 6 is an enlarged detail showing two forms of sealing grooves in the bridge washer.

Referring first to the embodiment of Fig. 1 the numeral 10 indicates a valve stem provided with the usual head 11 adapted to contact the inner surface of a tire tube 12. This stem is provided with the usual threaded tip 13 and has a threaded shank portion 14 adapted to receive a clamping nut 15. These structures are preferably of standard construction and are indicated by the same numerals in the several views. Received on the stem 10 is a bridge washer 16 adapted to be urged by the clamping nut 15 into such position that a sharp edge 17 on a downturned flange 18 thereof will penetrate the head 11 and form an air-tight seal while the washer portion 19 confines the tube 12 and compresses it to a predetermined desirable extent depending upon the initial thickness of the tube and the width of the flange 18. The tube contacting surface of the bridge washer is provided with one or more sealing grooves 20 into which a portion of the material of the tube 12 will be forced by the pressure of the bridge washer against such tube.

The modification of Fig. 2 differs in that the bridge washer is made of such shape as to have only one sealing groove 21. This form embodies the essential features described in connection with Fig. 1 and has the advantage that it can be "cold stamped". It consists in a single piece of sheet material having the sealing flange 22 affording a flat surface 23 for engagement with the clamping nut 15 as well as an inner clamping surface provided with the sealing groove 21. The modification of Fig. 3 differs from that of Fig. 1 essentially in that the wings 16ª have been omitted from the bridge washer as is also true in the modification of Fig. 2.

In the modification of Fig. 4 I have substituted for the flange 18 an annular member 24 which bites into the head 11 and into the lower surface of the bridge washer 25. In this case I have shown the wings 26 but it is to be understood that these may be omitted as in the modifications of Figs. 2 and 3. In this case I have also provided sealing grooves 27 on the tube contacting face of the bridge washer.

Fig. 6 is a detail view made to enlarged scale for the purpose of illustrating the special sealing groove which I employ. It will be noted that the bridge washer 27 bites into the head 11 forming a metal to metal airtight seal and a stop to prevent excessive deformation of the tube 12. While I have shown the groove 28 as having right angular corners and that 29 as having a rounded bottom, it is to be understood that either form may be employed to the exclusion of the other. It will be noted that in both cases the depth of the groove is somewhat greater than the width. The purpose of shaping these grooves as indicated is to allow the portion of the tube which enters the grooves to be formed under the influence of the re-molding effect into bodily flexible or bendable flaps.

When, in use, the re-molding action has proceeded to such an extent that the thickness of the portion of the tube 12 between the bridge washer and the head 11 is established and would remain the same even though the device were disassembled, there will be a tendency for air under the inflation pressure carried in the tube to pass between the contacting surfaces of the head 11 and the tube 12. If this occurs such air will not be able to pass out through the central opening in the bridge washer and will, so to speak, attempt to pass between the bridge washer and the tube 12. Such "attempt" will be unsuccessful because of the seal which exists between the tube and the bridge washer and a pressure will build up on the lower surface of the tube tending to urge the tube into contact with the bridge washer thereby intensifying the seal which causes such pressure to build up and effectually substituting air pressure for the mechanical contact pressure of the head 11 in maintaining sealing contact between the tube and the bridge washer. In order to insure that there will be sufficient sealing action to maintain sealing pressure against the tube tending to hold it in contact with the bridge washer, I provide the special sealing grooves in the bridge washer. These grooves are of such shape that the remolding effect results in the formation of ribs or flaps 30 sufficiently long with respect to their thickness that they may be moved bodily or flexed as a bodily bendable flap. As a result of this shape any air which might possibly find its way to the sealing ring would tend to push the same against the outer wall of the groove and thereby form a seal and prevent actual leakage.

The described construction makes practical the complete assembly of a tube and stem with the clamping nut 15 completely tightened and the seal at 17 formed and tested prior to shipment to the distributor whereby to avoid any improper assembly or failure to tighten the clamping nut, or loosening of the same in service.

While I have shown and described certain illustrative embodiments of my invention I wish it understood that the same is not limited to the details shown except in accordance with the spirit and scope of the appended claims.

Having thus described my invention, what I claim is:

1. In combination with a tire valve stem having a shank and a head, a washer having an opening through which said shank passes and between which and said head a tire tube is adapted to be confined, and means providing a stop to limit the compression of the tube between said head and washer and a seal to prevent the passage of air through said opening in the event such air should pass between said tire tube and said head.

2. In combination with a tire valve stem having a shank and a head, a washer having an opening through which said shank passes and between which and said head a tire tube is adapted to be confined, and means providing a stop to limit compression of the tube between said head and washer.

3. In combination with a tire valve stem having a shank and a head, a washer having an opening through which said shank passes and between which and said head a tire tube is adapted to be confined, and metallic means providing a seal, independent of the area of contact between said tube and said head, to prevent the passage of air through said opening in the event such air should pass said area of contact.

4. In a tire tube, a valve stem having a head member and a washer member between which a tire tube is confined, a sealing element separate from and of a material differing from the material of said tube extending from the washer to said valve stem, and the washer having formed therein a relatively deep sealing groove having at least a portion of its outside wall substantially perpendicular to the plane of the member.

5. In combination with a metallic tire valve stem comprising a shank and a head, a metal washer received on said stem and between which and the head an inner tube is confined, and means forming between the washer and the stem a metal-to-metal air-tight seal.

6. In combination with a tire valve including a valve stem having a head member, a washer member received on said stem and between which and the head member a tire tube is confined, and means located between said members and integral with one of them for penetrating below the surface of the metal of the other, said means surrounding the valve stem and forming an air-tight metallic seal.

7. As a new article of manufacture, a metal washer for tire valves provided with an opening and having an annular flange surrounding the opening, the flange being provided with a sharp edge which enables the same to bite into and form its own seat on the valve stem when in position thereon.

8. As a new article of manufacture, a metal bridge washer for tire valves provided with a central aperture, an annular flange on one face of the washer and surrounding the aperture, sharply defined grooves surrounding said flange, said flange being provided with a sharp edge which enables the same to bite into and form its own seat on the valve stem when in position thereon.

9. In combination with a metallic tire valve, including a valve stem having a head, a metal washer received on said stem and between which and the head an inner tube is clamped and a ring member having sharp edges, located between the washer and the head and forming a metal to metal air-tight seal.

10. In a tire tube, a valve stem having a head member and a washer member between which a tire tube is confined, and having a sealing element separate from and of a material differing from the material of the tube providing an impervious wall surrounding the valve stem and extending from the washer to the valve stem for insuring an air tight joint between the washer and the valve stem and one of said members having formed therein a relatively deep sealing groove for receiving therein a portion of the tube when the washer and the head with the tube therebetween are clamped together.

11. In combination with a tire valve including a valve stem having a head member, a washer member received on said stem and between which and the head member a tire tube is confined, and an annular portion located between said members and integral with one of them, said annular portion having its free end constructed so as to provide a peripheral air-tight seal between it and the other member.

12. In combination with a tire valve, including a valve stem having a head, a washer received on said stem and between which and the head an inner tube is clamped, and a metallic tubular ring member having one end in engagement with the stem and its other end in engagement with the washer to provide an air-tight seal.

13. A pneumatic tire valve assembly comprising a valve stem and an associated washer between which the tire tube is clamped and having a metallic sealing element providing an impervious wall surrounding the valve stem and extending from the washer to the valve stem for insuring an air tight joint between the washer and the valve stem.

In testimony whereof I have hereunto set my hand this 6th day of April, 1932.

DELPHIN H. SPICER.